H. B. SLATER.
PROCESS FOR EXTRACTING COPPER FROM ITS ORES.
APPLICATION FILED JULY 28, 1915.
1,230,078. Patented June 12, 1917.
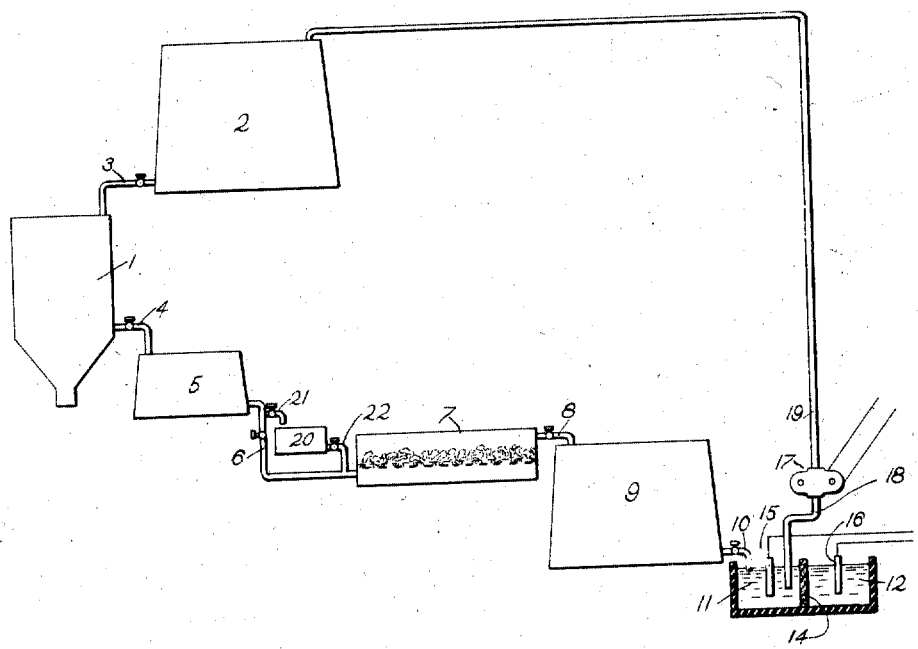
Inventor:
Henry Byron Slater.
by Arthur P. Knight
atty

UNITED STATES PATENT OFFICE.

HENRY BYRON SLATER, OF LOS ANGELES, CALIFORNIA.

PROCESS FOR EXTRACTING COPPER FROM ITS ORES.

1,230,078.

Specification of Letters Patent. Patented June 12, 1917.

Application filed July 28, 1915. Serial No. 42,343.

*To all whom it may concern:*

Be it known that I, HENRY BYRON SLATER, a citizen of the United States, residing at Los Angeles, in the county of Los Angeles and State of California, have invented a new and useful Process for Extracting Copper from its Ores, of which the following is a specification.

This invention relates to a process of extracting copper from its ores by the action of a leaching solution containing ferric chlorid or like leaching agent, and the invention is especially adapted for use with ores containing base metal compounds, such as calcium carbonate, which tend to precipitate the iron or other equivalent metal from the solution. An important object of the present invention is to provide for cyclic leaching, precipitating and regenerating operations in such manner that the requisite content of iron or its equivalent may be provided in the leach, notwithstanding the depleting action due to the base metal compound in the ore.

My invention consists essentially in leaching the ore with a solution containing ferric chlorid, or its equivalent, together with sufficient sodium chlorid or equivalent chlorid to serve as a carrier for the cuprous chlorid formed in the leaching operation; precipitating the copper from the solution by means of iron, in such manner as to restore to the solution the iron it has lost during the leaching operation; and then regenerating the solution in such manner as to restore it to its original condition, or to a condition equivalent to its original condition, for repetition of the leaching operation, in cyclic manner.

In applying my process to the treatment of ores containing native copper the leaching operation reduces the ferric to ferrous chlorid, so that the primary loss of iron in the leaching operation is occasioned by the action of the base metal compound present. Under these conditions the accumulation of iron in the precipitation of the copper by means of iron tends to balance the loss of iron in leaching, and any lack of complete balance may be made up as hereinafter set forth.

The accompanying drawing is a diagrammatic elevation, partly in section, of an apparatus suitable for carrying out my invention.

Said apparatus may comprise an agitator or leaching tank 1, connected to receive the leaching solution from a storage tank 2 through a valved pipe 3, and said leaching tank having an outlet for the lixiviate through valved pipe 4 to a lixiviate storage tank 5, which discharges through valved pipe 6 to the precipitating tank 7. From tank 7, a valved pipe 8 leads to spent liquor tank 9, which is connected through valved outlet pipe 10 to the anode compartment 11, of a two compartment electrolytic cell, said cell having also a cathode compartment 12, separated from the anode compartment by a permeable diaphragm 14, consisting for example of asbestos cloth, and being provided with anode and cathode members 15 and 16 in the respective compartments 11 and 12. Said anode and cathode members may be of any suitable material, for example carbon. Suitable means such as pump 17 with piping 18 and 19 is provided for returning the regenerated solution from the anode compartment of this cell to the storage tank 2. Another tank 20 is connected by valve pipe 21 with tank 5, so that a portion of the solution in tank 5 may be drawn into said tank 20 for separate treatment, said tank 20 having a discharge pipe 22 leading to the precipitator 7.

In extracting copper from ore containing native copper and a base metal compound, such as calcite, my process may be carried out as follows: The leaching liquid, consisting of a solution of ferric chlorid in water, of a strength for example of one half to one per cent. ferric chlorid, and also containing sodium chlorid or its equivalent, in proportion of say five to fifteen per cent., and containing also, if desired, free chlorin and oxidation products thereof, for example, hypochlorous acid, is supplied to the storage tank 2. The ore, crushed to a suitable state of division, is supplied to the leaching tank or agitator 1, and the leaching solution from tank 2 is supplied through pipe 3 to tank 1, so as to cover the ore, which is then agitated with such solution until the leaching operation is completed. This leaching operation consists mainly in solution of the copper as chlorid, and particularly as cuprous chlorid, by the ferric chlorid, which is reduced at the same time to ferrous chlorid. Any cuprous chlorid formed in this operation is retained in solution by reason of the presence of sodium chlorid. At the same time any calcium carbonate present in the ore will react to some extent with the iron chlorid, especially in ferrous form, precipitating some of the iron as carbonate or hydrate and causing some of the calcium to be taken up into the solution as chlorid; this chlorid of calcium aids the sodium chlorid in retaining the cuprous chlorid in solution.

The lixiviate is discharged into tank 5, and thence into the precipitating tank 7, where it is brought into contact with metallic iron, which reduces to metallic state any copper contained in the solution, and also reduces any ferric chlorid in the solution to ferrous chlorid. In this operation the iron goes into solution as ferrous chlorid, and if there were no loss of iron in leaching this would cause an accumulation of the iron in the leaching solution. According to my invention, the base metal compound in the ore is utilized as a means of precipitating the excess of iron, or so much of it as may be practicable, and I prefer to carry out the process so that the solution which reaches the precipitating tank will be depleted of iron to an amount equivalent to that which will be taken up in precipitating the copper present. If the action of the calcium carbonate in the ore is not sufficient to produce such depletion, then a suitable agent may be added in the tank 5, before the solution is passed to the precipitating tank, to take up or remove from active condition a certain amount of the chlorin present, so that less iron will be taken up in the precipitating operation. For this purpose I may use sodium hydroxid, formed in the regenerating stage of the process, such sodium hydroxid being added to the solution in tank 5 or to a portion thereof, in sufficient amount, and at such temperatures as to react with the ferric chlorid present, to form sodium chlorid and ferric hydrate. It is preferred to draw off a part of the solution from tank 5, into tank 20 and to treat it with sodium hydroxid about 100 C., so as to avoid precipitation of copper, the solution being then passed along with the remainder of the solution from tank 5 into the precipitating tank 7. In this manner the amount of iron remaining in the leach as it passes to the precipitating operation may be reduced and the amount of iron taken up in the precipitation may also be reduced so as to enable the iron taken up in precipitation of the copper to balance the loss of iron in leaching. In case there is a tendency to overdepletion of iron in leaching, this may be corrected by increasing the amount of leaching solution for a given amount of ore.

From the precipitating tank 7, the spent leach may be passed to storage tank 9, whence it is conducted through the anode compartment 11 of the electrolytic cell. In this compartment it is subjected to the action of free chlorin liberated at the anode 15 (by electrolysis of the sodium chlorid in the solution) and the leach is thereby regenerated, such regeneration consisting mainly in the conversion of the ferrous chlorid in the solution to ferric chlorid. The regenerative action may be continued after all of the ferrous chlorid is converted to the ferric state, so as to produce more or less free chlorin, together with hypochlorous acid, such hypochlorous acid being formed for example by the action of the free chlorin in the anode compartment on cathode products migrating through the permeable diaphragm from the cathode compartment. The cathode compartment may contain a solution of sodium chlorid in its equivalent, the electrolysis producing sodium hydroxid or equivalent hydroxid in the cathode compartment, and such hydroxid diffusing more or less through the permeable diaphragm into the anode compartment, and reacting with the contents thereof to form hypochlorous acid.

The regenerated solution is conducted or pumped from the anode compartment 11 back to the storage tank 2, ready for use in a repetition of the cycle on a fresh body or ore.

In case there is any copper oxid or carbonate present in the ore, its solution will be attended with precipitation of iron from the ferric chlorid. In the case of the oxid, this reaction may be represented by the following equation:

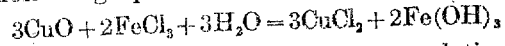
$$3CuO + 2FeCl_3 + 3H_2O = 3CuCl_2 + 2Fe(OH)_3$$

In this case, therefore, the accumulation of iron in precipitation of the copper is balanced by the precipitation of iron in the solution of the copper, as far as the copper is present in the form of oxid. This precipitation of iron by copper oxid or carbonate present may reduce the amount of precipitation of iron by the base metal compound (calcite) required for maintaining the iron balance. In case the precipitation of iron by the action of the copper oxid or carbonate, together with that due to the calcite present, is in excess of the iron taken up in precipitation of the copper, the ferric chlorid may be used in excess of the amount required for solution of the copper, so that an additional amount of iron will be taken up in the precipitation of the copper, during the reduction of this excess of ferric chlorid to ferrous chlorid.

In the operation of the above described process, the reaction of the calcite or other base metal compound with the ferric chlorid will, in general, result in the formation of a soluble chlorid, for example, in the case of calcite present in the ore, calcium chlorid will be formed in the solution, and this chlorid will act as a carrier for cuprous chlorid interchangeably with sodium chlorid. As the process proceeds in cyclic manner, the amount of calcium chlorid present in the leach may progressively increase, and may, if desired, eventually supersede the sodium chlorid by reason of the gradual loss of the latter in washing, etc., and the gradual accumulation of the calcium chlorid. If at any time it is desired to reduce the amount of calcium chlorid present, a suitable precipitant therefor may be added to the spent leach, for example, sodium sulfate or sodium hydroxid taken from the cathode compartment of the electrolytic cell, the excess of calcium being then precipitated as sulfate or as hydroxid, and sodium chlorid being formed in the solution in place thereof. A further advantage of this mode of operation is that the calcium chlorid present in the leach tends to inhibit the solution of the calcite or alkaline earth metal compound in the ore.

I have specified sodium chlorid as the agent used for retaining the cuprous chlorid in solution and as the source of the chlorin needed for regeneration. Any other suitable chlorid may, however, be used interchangeably therewith, for example, the chlorid of any alkali metal chlorid or of any alkaline earth metal. And in particular, calcium chlorid may be used as such retaining agent, either by gradual substitution thereof for the sodium chlorid, in cyclic operation of the process, or by the use of calcium chlorid throughout the process instead of sodium chlorid.

What I claim is:

1. The process of extracting copper from ores containing copper together with an alkaline earth metal compound capable of precipitating iron from its solutions, which consists in leaching the ore with a solution containing ferric chlorid, and a metallic chlorid serving to retain cuprous chlorid in solution whereby the copper is dissolved and a portion of the iron is precipitated, removing the solution from the ore, precipitating the copper from the solution by the action of metallic iron, in such manner as to restore to the solution a quantity of iron substantially equivalent to that lost in leaching, and then regenerating the solution by the action of free chlorin.

2. The process of extracting copper from ore containing native copper together with an alkaline earth metal compound capable of precipitating iron from its solutions, which consists in leaching the ore with a solution containing ferric chlorid together with a metallic chlorid serving to retain cuprous chlorid in solution whereby the copper is dissolved and a portion of the iron is precipitated by the action of the base metal compound, removing the solution from the ore, precipitating the copper from the solution by the action of metallic iron, in such manner as to restore to the solution a quantity of iron substantially equivalent to that lost in the leaching operation, and then regenerating the solution by the action of free chlorin.

3. The process of extracting copper from ore containing native copper together with calcite, which consists in leaching the ore with a solution of ferric chlorid and calcium chlorid, whereby the copper is dissolved, a portion of the iron is precipitated and calcium chlorid is taken into solution, removing the solution from the ore, precipitating the copper from the solution by the action of metallic iron in such manner as to restore to the solution a quantity of iron substantially equivalent to that lost in the leaching operation, regenerating the solution by the action of free chlorin, and using the regenerated solution for leaching fresh ore, the calcium chlorid in the regenerated solution being utilized for retaining the cuprous copper in solution.

4. The process of extracting copper from ores containing copper together with a calcium compound, which consists in leaching the ore with a solution of ferric chlorid and sodium chlorid, so as to dissolve the copper of the ore, and to cause precipitation of a portion of the iron of the ferric chlorid and solution of a portion of the calcium of the ore as calcium chlorid, removing the solution from the ore, precipitating the copper by the action of metallic iron, in such manner as to restore to the solution a quantity of iron substantially equivalent to that lost in the leaching operation, and regenerating to produce a solution for repetition of the process, such solution containing calcium chlorid, serving as a carrier for cuprous chlorid in place of sodium chlorid lost in the leaching operation.

In testimony whereof I have hereunto set my hand, at Los Angeles, California, this 21st day of July 1915.

HENRY BYRON SLATER.

It is hereby certified that in Letters Patent No. 1,230,078, granted June 12, 1917, upon the application of Henry Byron Slater, of Los Angeles, California, for an improvement in "Processes for Extracting Copper from Its Ores," an error appears in the printed specification requiring correction as follows: Page 2, lines 109-110, for the word "carmonate" read *carbonate;* and that the said Letters Patent should be read with this correction therein that the same may conform to the record of the case in the Patent Office.

Signed and sealed this 7th day of August, A. D., 1917.

[SEAL.]

F. W. H. CLAY,

*Acting Commissioner of Patents.*